D. T. McNIEL.
SHAFT COUPLING.
APPLICATION FILED JUNE 5, 1908.
915,370.
Patented Mar. 16, 1909.
2 SHEETS—SHEET 1.
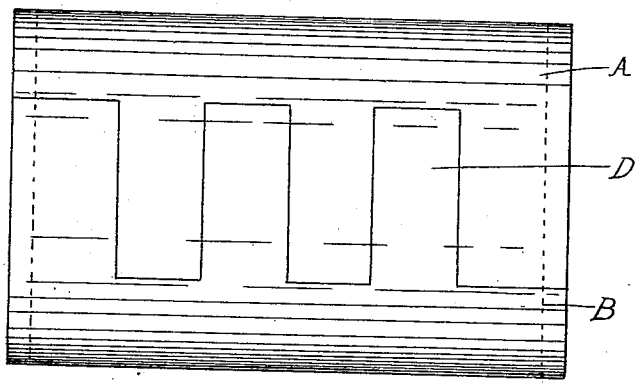
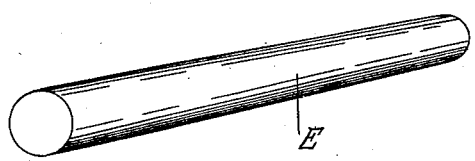
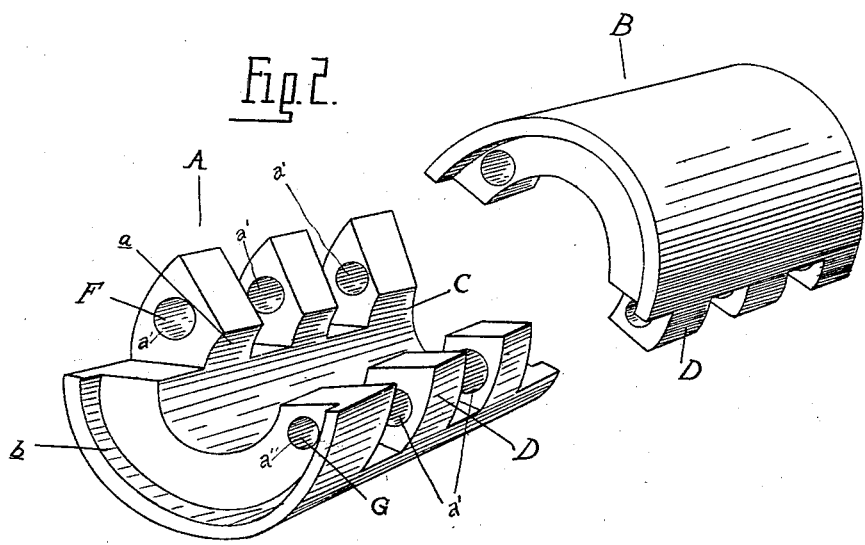
Witnesses
Inventor
Daniel T. McNiel
By Whittemore Hulbert Whittemore
att'ys D. T. McNIEL.
SHAFT COUPLING.
APPLICATION FILED JUNE 5, 1908.
915,370.
Patented Mar. 16, 1909.
2 SHEETS—SHEET 2.
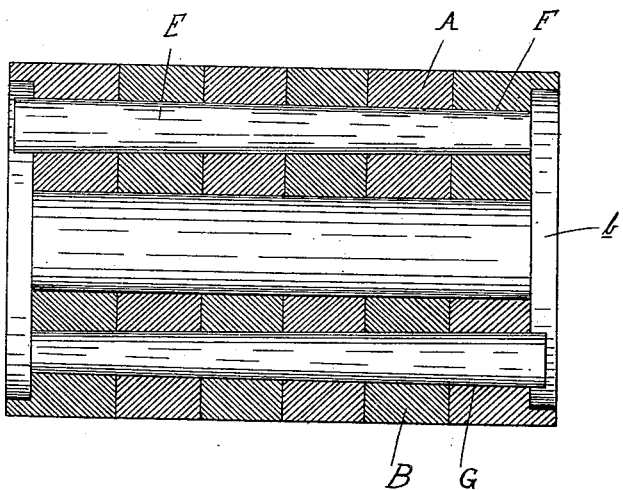
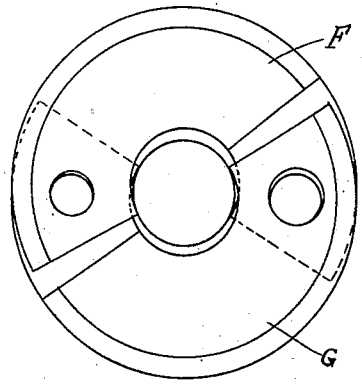
Witnesses
WX Ford
HJBelknap
Inventor
Daniel T. McNiel
By Whitmore Hulbert & Whitmore
attys

UNITED STATES PATENT OFFICE.

DANIEL T. McNIEL, OF DETROIT, MICHIGAN, ASSIGNOR OF ONE-HALF TO PAUL C. McNIEL, OF DETROIT, MICHIGAN.

SHAFT-COUPLING.

No. 915,370.           Specification of Letters Patent.        Patented March 16, 1909.

Application filed June 5, 1908. Serial No. 436,881.

*To all whom it may concern:*

Be it known that I, DANIEL T. McNIEL, a citizen of the United States of America, residing at Detroit, in the county of Wayne and State of Michigan, have invented certain new and useful Improvements in Shaft-Couplings, of which the following is a specification, reference being had therein to the accompanying drawings.

The invention relates particularly to a sectional shaft coupling adapted to hold the meeting ends of shafts to which it is applied against relative rotation by compression only, thereby dispensing with the use of the ordinary keys or similar appliances which require a special construction or fashioning of the shaft in connection with which the coupling is to be used.

The invention consists in the novel construction of the coupling, in the peculiar arrangement and combination of its parts, and in various details of construction as will be more fully hereinafter set forth.

In the drawings,—Figure 1 is a view in side elevation of a shaft coupling embodying my invention; Fig. 2 is a perspective view of the coupling members detached; Fig. 3 is a horizontal section taken centrally through the coupling; Fig. 4 is an end view, showing the position of the members before they are clamped to the shaft; and Fig. 5 is a perspective view of the clamping pin.

In construction, the shaft coupling is composed of two complementary longitudinal members A and B, each provided centrally with a longitudinally extending bearing surface C, and at each side with a series of lateral projections or fingers D. These projections, as shown, are spaced longitudinally one from another in each series, and when the members are assembled they interlace, as indicated in Fig. 1. The fingers or projections in each series are so fashioned as to form portions of the coupling bearing, the inner surface $a$ of each finger being a continuation of the bearing surface C of its coupling section, and being adapted when applied to the shaft to contact therewith. In this manner, a greater amount of frictional surface is provided for the coupling, which allows a better clamping engagement to be effected between the latter and the shaft sections to which the coupling is applied. The preferable coupling means for the members are tapered pins, as E (Fig. 5), adapted to be fitted within oppositely tapered bores F G formed longitudinally in each side of the coupling by apertures, as $a'$, in the interlacing fingers. The apertures formed in one series of teeth are slightly out of registration with the apertures in the adjoining series, so that when the pins are driven in the projections will be forced inwardly into contact with and clamp against the shaft.

I may and preferably do form the coupling so that its entire inner surface, including the finger sections, will bear against the shaft sections to be joined, and thereby obtain a maximum clamping effect between the parts. To accomplish this, the curve of the bearing surface of each coupling member is made of greater radius than that of the shaft to which the coupling is to be applied, so that before the members are clamped one to the other the several series of teeth will extend a slight distance away from the shaft, as shown. As the wedging is effected by the insertion of the pins, the side portions of each coupling member will be sprung inwardly into engagement with the shaft, and the coupling throughout its entire interior will be in frictional engagement with the shaft surface.

In the construction of coupling shown, the teeth sections on each member project a slight distance beyond the center, so that in applying the coupling the members are necessarily partially assembled and the coupling in its entirety applied to the shaft by an endwise movement.

In the preferable form of coupling, the heads of the pins when the latter are in place project a slight distance beyond the coupling ends, and for the purpose of protecting these projecting portions of the pins I provide semicircular flanges $b$ upon the coupling, which serve as a housing.

What I claim as my invention is,—

1. A sectional shaft coupling, comprising complementary longitudinal members having marginal interlacing clamping projections or teeth forming portions of the inner bearing surface of the coupling and adapted upon assembly of the members to contact with the shaft ends, and means for clamping the members.

2. A sectional shaft coupling, comprising complementary longitudinal members having marginal interlacing clamping teeth forming portions of the inner bearing surface of the coupling and adapted upon the clamping together of the sections to contact with the shaft ends, the several teeth being apertured to form a longitudinal bore at each side of the coupling, and the bores being oppositely tapered, and tapered pins engaging the bores.

3. A sectional shaft coupling, comprising two longitudinal members, each having a curved bearing surface, and marginal projections or fingers forming continuations of said surface and adapted to contact with the shaft ends upon the assembly of the members, the curve of the bearing surface being of greater radius than that of the shaft to which the coupling is to be applied, and means for clamping the sections upon the shaft.

In testimony whereof I affix my signature in presence of two witnesses.

DANIEL T. McNIEL.

Witnesses:
NELLIE KINSELLA,
JAMES P. BARRY.